United States Patent
Bach et al.

(10) Patent No.: US 11,976,701 B2
(45) Date of Patent: May 7, 2024

(54) EXPANSION DEVICE HAVING A READJUSTMENT UNIT FOR A DRUM BRAKE

(71) Applicant: Continental Teves AG & Co. oHG, Frankfurt am Main (DE)

(72) Inventors: Uwe Bach, Frankfurt am Main (DE); Martin Gädke, Frankfurt am Main (DE); Holger von Hayn, Frankfurt am Main (DE); Ahmed Sefo, Frankfurt am Main (DE); Jens Hoffmann, Frankfurt am Main (DE); Adrian Messner, Frankfurt am Main (DE); Wolfgang Ritter, Frankfurt am Main (DE); Falk Petzold, Frankfurt am Main (DE); Matthias Schulitz, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 518 days.

(21) Appl. No.: 17/280,341

(22) PCT Filed: Sep. 25, 2019

(86) PCT No.: PCT/EP2019/075780
§ 371 (c)(1),
(2) Date: Mar. 26, 2021

(87) PCT Pub. No.: WO2020/064786
PCT Pub. Date: Apr. 2, 2020

(65) Prior Publication Data
US 2022/0034377 A1 Feb. 3, 2022

(30) Foreign Application Priority Data
Sep. 26, 2018 (DE) ...................... 10 2018 216 488.6

(51) Int. Cl.
*F16D 65/56* (2006.01)
*B60T 1/06* (2006.01)
(Continued)

(52) U.S. Cl.
CPC ............ *F16D 65/562* (2013.01); *B60T 1/067* (2013.01); *F16D 51/22* (2013.01); *F16D 65/22* (2013.01);
(Continued)

(58) Field of Classification Search
CPC ......... F16D 51/22; F16D 65/562; B60T 1/067
See application file for complete search history.

(56) References Cited

U.S. PATENT DOCUMENTS

| | | |
|---|---|---|
| 6,119,822 A | 9/2000 | Baldwin |
| 8,215,649 B2 | 7/2012 | Mack |

(Continued)

FOREIGN PATENT DOCUMENTS

| | | |
|---|---|---|
| CN | 101340996 A | 1/2009 |
| DE | 19858319 A1 | 6/2000 |

(Continued)

OTHER PUBLICATIONS

International Search Report and Written Opinion for International Application No. PCT/EP2019/075780, dated Dec. 13, 2019, with partial English translation, 8 pages.

(Continued)

*Primary Examiner* — Melody M Burch
(74) *Attorney, Agent, or Firm* — BUCHANAN INGERSOLL & ROONEY PC (57) ABSTRACT

The proposal is for an improved expansion device for a drum brake having an integrated readjustment unit having a readjusting screw which can be locked therein by a spring-loaded latching unit which, for a reliable readjustment function with a reduced level of force, provides for the (Continued)

latching unit to allow a defined idle rotation of the readjusting screw, which is defined structurally by a first stop acting in a first direction of revolution and a second stop acting in the opposite direction of revolution.

11 Claims, 5 Drawing Sheets

(51) Int. Cl.
*F16D 51/22* (2006.01)
*F16D 65/22* (2006.01)
*F16D 121/24* (2012.01)
*F16D 125/40* (2012.01)

(52) U.S. Cl.
CPC ...... *F16D 2121/24* (2013.01); *F16D 2125/40* (2013.01)

(56) References Cited

U.S. PATENT DOCUMENTS

| | | |
|---|---|---|
| 8,619,213 B2 | 12/2013 | Kim et al. |
| 10,151,365 B2 | 12/2018 | Bach et al. |
| 2010/0122879 A1 | 5/2010 | Louis et al. |

FOREIGN PATENT DOCUMENTS

| | | | |
|---|---|---|---|
| DE | 19858642 A1 | 6/2000 | |
| DE | 102014226268 A1 | 6/2016 | |
| DE | 102014226270 A1 | 6/2016 | |
| DE | 102014226273 A1 | 6/2016 | |
| GB | 1341936 A | 12/1973 | |
| GB | 2168770 A | 6/1986 | |
| GB | 2178808 A * | 2/1987 | ............ F16D 65/18 |
| GB | 2294739 A * | 5/1996 | ........... F16D 65/562 |
| JP | 491785 U | 1/1974 | |
| KR | 20110083359 A | 7/2011 | |
| KR | 20110009669 U | 10/2011 | |
| WO | 9928649 A1 | 6/1999 | |
| WO | WO-2016096680 A1 * | 6/2016 | ............ F16D 51/22 |

OTHER PUBLICATIONS

German Search Report for German Application No. 10 2018 216 488.6, dated Jul. 31, 2019, with partial English translation,9 pages.
Chinese Office Action for Chinese Application No. 201980049900. 6, dated Dec. 22, 2021, with translation, 14 pages.
Brazilian Office Action for Brazilian Application No. 112021005604-1, dated Jun. 8, 2023 with partial translation, 8 pages.
Chinese Office Action for Chinese Application No. 201980049900. 6, dated Jun. 13, 2022, with translation, 15 pages.
Japanese Notice of Reasons for Refusal for Japanese Application No. 2021-516975, dated Feb. 8, 2022, with translation, 8 pages.
Japanese Decision to Grant a Patent for Japanese Application No. 2021-516975, dated May 25, 2022, with translation, 3 pages.

* cited by examiner

EXPANSION DEVICE HAVING A READJUSTMENT UNIT FOR A DRUM BRAKE

CROSS REFERENCE TO RELATED APPLICATIONS

This application is the U.S. National Phase Application of PCT International Application No. PCT/EP2019/075780, filed Sep. 25, 2019, which claims priority to German Patent Application No. 10 2018 216 488.6, filed Sep. 26, 2018, the contents of such applications being incorporated by reference herein.

FIELD OF THE INVENTION

The invention relates to an expansion device for a drum brake and to an associated drum brake.

BACKGROUND OF THE INVENTION

The use of drum brakes configured as service brakes on vehicles, especially electric vehicles, is known. These often have an expansion unit driven in rotation. In this case, an electric motor with a reduction gear connected to the output is generally used as a drive for the expansion unit.

With expansion units of this kind, there is furthermore a known practice of using simple and robust ball ramp assemblies to convert the rotary motion of the drive into a translational expanding motion of the output. In the case of a ball ramp assembly, three or more balls are generally clamped between two disks, in ramps machined therein and aligned in opposite directions in the circumferential direction, with the result that, when one of the disks is rotated, the balls roll in the ramps and thereby push the disks apart.

In this context, one characteristic feature of ball ramp assemblies is a relatively short stroke, which is restricted by the diameters of the balls and disks, which are severely limited owing to the installation space, as well as the depth of the ramps. Using the stroke of the ball ramp assemblies alone, it is generally not possible to provide sufficient compensation of service-related wear on the brake linings of a drum brake. There is therefore a known practice of providing expansion units with ball ramp assemblies that have an integrated readjustment unit for compensating the wear travel.

As regards the technical background, attention is drawn here to DE 10 2014 226 270 A1, for example, incorporated herein by reference. This describes an expansion device having two ball ramp assemblies, in which readjustment for the wear travel is accomplished by rotating a separate threaded readjusting screw arranged coaxially with the expansion axis in a direction of readjustment, wherein the readjusting screw is prevented from rotating in the opposite direction by means of a latching unit.

The disadvantage with known expansion devices having integrated readjustment units in general and with rigid ball ramp arrangements in particular is that readjustment takes place with a high expansion force, resulting in a relatively high internal level of force during the readjustment process. During the process of release, for example, this can cause increased frictional forces between the rotatable components and have negative effects on further aspects, e.g. efficiency during reverse rotation, constancy of the control characteristic, wear of the friction partners and of other components etc.

SUMMARY OF THE INVENTION

An aspect of the invention is an improved expansion device having an integrated readjustment unit for a drum brake which, in particular, allows a reliable readjustment function with a reduced level of force.

An aspect of the invention envisages that the latching unit allows a defined idle rotation of the readjusting screw, which is defined structurally by two mutually spaced stops acting in the direction of revolution.

Fixing of the readjusting screw, as required for readjustment, is thereby selectively delayed until an operating point during the process of release at which a large part of the expansion force has already been dissipated. Readjustment can thus take place while the forces acting are low, friction and wear are reduced, the service life is increased and the control characteristic is made more uniform through the avoidance of step changes in force, especially those due to static friction. By virtue of a significant reduction in the loading on components of the readjustment unit, it is possible to dispense with an additional readjuster outside the expansion device.

In the preferred embodiment, the expansion device can be driven in rotation and can have at least one ball ramp assembly for converting a rotary driving motion into a translational expanding motion.

As a result, it can be of particularly rigid and robust configuration in the expansion direction and can be used in any type of motor vehicle, especially electric vehicles.

An aspect of the invention furthermore envisages that the readjustment unit has a blocking member, which is arranged in a manner elastically preloaded axially against the readjusting screw, and the latching unit is arranged between the blocking member and the readjusting screw.

It is thereby possible, in a particularly effective, space-saving and robust manner, to obtain a coaxial drive for automatic readjustment but also for initial setting when constructing a new brake which is furthermore decoupled from the expansion force.

For further improved, particularly robust and uncomplicated control of readjustment, the latching unit can comprise a first latching tooth system, which is formed on the end of the readjusting screw and a second latching tooth system, which is formed on the end of the blocking member and which, in interaction with the first latching tooth system, allows a relative rotation in one circumferential direction, forming an axially acting force, and blocks relative rotation in the opposite direction.

The idle rotation according to an aspect of the invention can be achieved in a particularly simple and reliable manner if the blocking member is mounted so as to be rotatable in the circumferential direction between the stops relative to the expansion piston.

In this case, the stops can be designed simply and robustly as sides of a circular-sector-shaped region of an aperture, against which a radial projection on another component strikes. In this case, the idle rotation can be defined structurally in a clear and reliable manner through the configuration of the sector angle together with the width of the projection.

The possibility of producing the components in a particularly efficient way can be achieved if the aperture is formed in the expansion piston, and the blocking member has at least one shank having at least one radial projection arranged thereon, which enters the aperture. It is thus possible, for example, for the expansion piston to be produced simply by punching out of a sheet metal material.

For simplified interaction with an electromechanical actuating drive and, furthermore, compact construction, the expansion device can be actuated by means of a driving sleeve, which, for this purpose, is provided, at least in some region or regions, with an external tooth system and is rotatably mounted in the housing of the expansion device.

The preferred embodiment of the invention envisages that a readjusting piston having the readjusting screw screwed therein, and a supporting piston are arranged in the driving sleeve, wherein the readjusting piston and the supporting piston are mounted in such a way as to be secured against rotation relative to the driving sleeve and to be axially movable, and wherein the supporting piston can be supported axially in the direction of the readjusting piston on the readjusting screw.

As a particular preference, it can be further developed by forming a first ball ramp assembly between the readjusting piston and the first expansion piston, and a second ball ramp assembly between the expansion piston and the second expansion piston.

A particularly compact and rigid construction of the expansion device with a symmetrical force characteristic that is favorable to a constant control characteristic and to a high efficiency and with a reduced number of components moved in translation and subject to friction is thus achieved.

Moreover, an aspect of the invention claims a drum brake comprising at least one expansion unit according to an aspect of the invention. Here, the expansion unit according to an aspect of the invention can be used with equal success in different types of drum brake, e.g. in duo-servo or simplex drum brakes.

BRIEF DESCRIPTION OF THE DRAWINGS

Further features, advantages and possible uses of aspects of the invention will emerge from the following description. In the figures.

DETAILED DESCRIPTION OF THE PREFERRED EMBODIMENTS

Because the fundamental manner of operation of drum brakes and ball ramp assemblies is sufficiently well known, only those functional characteristics which are essential to an aspect of the invention will be explored below.

Figure 1:
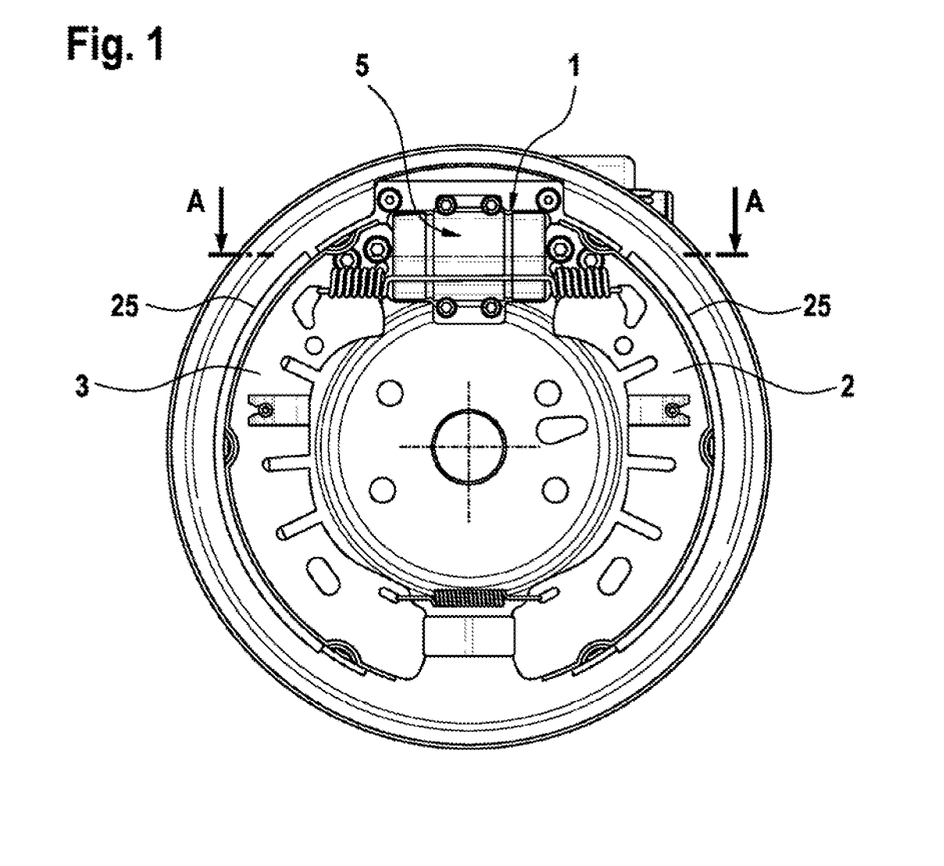
FIG. 1 shows a plan view of a drum brake having an expansion unit according to an aspect of the invention with the brake drum removed.

FIG. 1

FIG. 1 shows, by way of example, a drum brake 4 with the brake drum removed. An expansion device 1 spreads apart two brake shoes 2, 3 with a brake lining 25 mounted thereon against the brake drum (not shown). Due to the wear of the brake linings 25, the expansion travel required for a braking process increases continuously up to a defined wear limit. The increased wear travel is compensated in stages by a readjustment unit 8 (described below) arranged in the housing 5.

In order to avoid asymmetric, nonuniform contact of the linings 25 with the brake drum, the housing 5 of the expansion device 1 can here be mounted so as to float along the expansion axis A.

Figure 2:
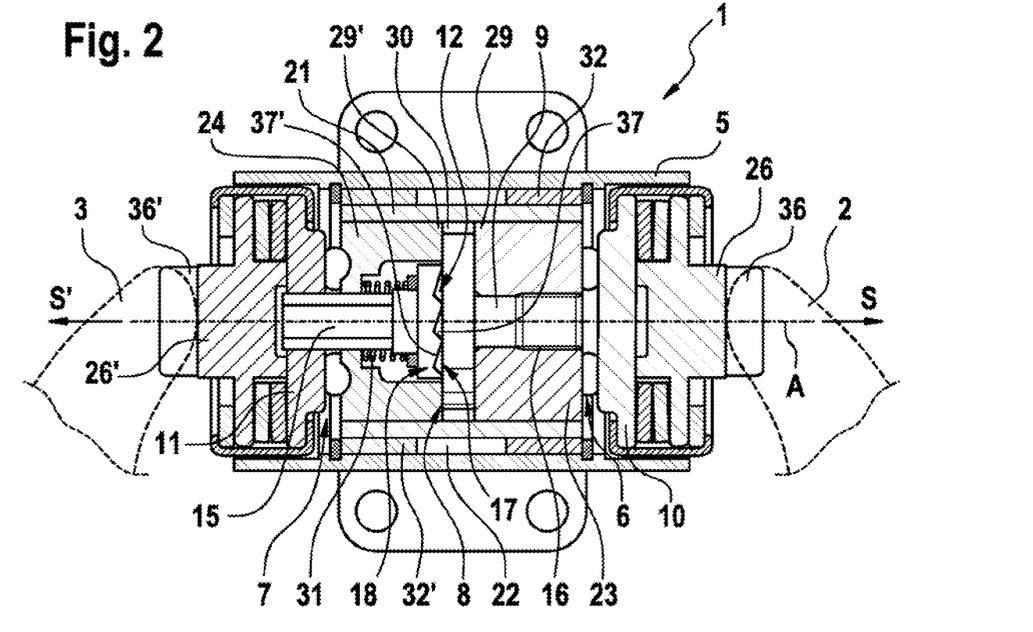
FIG. 2 shows a first embodiment of the expansion unit according to the invention in axial section.

FIG. 2

FIG. 2 shows an embodiment of the expansion device 1 in an initial state with no readjustment, in an axial section through the expansion axis A. In this embodiment, the expansion device 1 is actuated by a rotary driving motion by an electric-motor drive unit (not illustrated). During this process, a torque is introduced, e.g. by means of a wheel or drive belt (not illustrated), via a radial external tooth system 22 into a driving sleeve 21 mounted in the housing 5 in such a way as to be rotatable around the expansion axis A by means of radial bearings 31, 32.

A readjusting piston 23 and a supporting piston 24 are mounted within the driving sleeve 21 in such a way as to be secured against rotation and to allow axial movement. For this purpose, radial ribs 29, 29', which are guided in sliding fashion in a longitudinal groove 30 in the driving sleeve 21, are provided on the readjusting piston 23 and the supporting piston 24.

A readjusting screw 9 is connected positively to the readjusting piston 23 by means of a thread 16, with the result that the readjusting piston 23 moves axially when the readjusting screw 9 is rotated around the expansion axis A. During this process, the supporting piston 24 is supported axially in the direction of the readjusting piston 23 on the readjusting screw 9.

Moreover, the expansion device 1 has in its housing 5 two expansion pistons 10 and 11, which, in this embodiment, act on brake shoe mounts 26, 26' via interposed diaphragm springs. The supporting pistons 10, 11 are mounted in such a way as to be axially movable and secured against rotation in the circumferential direction relative to the housing 5.

Within the scope of an aspect of the invention, the antirotation means can be embodied in different ways to suit the specific application. In the embodiment shown, this is implemented, by way of example, by brake shoe mounts 26, 26', which are supported by means of their mounting slots 36, 36' against the flat brake shoes 2, 3 in the circumferential direction.

Respective ball ramp assemblies 7 are formed between the readjusting piston 23 and the expansion piston 10 and between the supporting piston 24 and the expansion piston 11. When the driving sleeve 21 is actuated by the drive unit, the expansion pistons 24 and the readjusting piston 23 are taken along in rotation and, by virtue of the ball ramp assemblies 6, 7, cause a translational expansion of the two expansion pistons 10, 11.

The readjustment unit 8 comprises a blocking member 15, which is arranged substantially within the supporting piston 24, coaxially with the expansion axis A. By means of a spring element 31, which is supported on the supporting piston 24, the blocking member 15 is continuously elastically preloaded axially against the readjusting screw 9.

Arranged between the blocking member 15 and the readjusting screw 9 is a latching unit 12 in the form of two axial latching tooth systems 17, 18, which engage in one another in complementary fashion. The first latching tooth system 17 is formed on the end of the readjusting screw 9, and the second latching tooth system 18 is formed on the end of the blocking member 15. The two latching tooth systems 17, 18 are each configured as a kind of latching tooth system having a plurality of teeth 37, 37' distributed over the circle circumference, in each of which one tooth flank is embodied as a shallower ramp and the other tooth flank is embodied as a steeper ramp end face. By virtue of latching tooth system 17, relative rotation between the blocking member 15 and the readjusting screw 9 is possible in just one circumferential direction.

Figure 3:
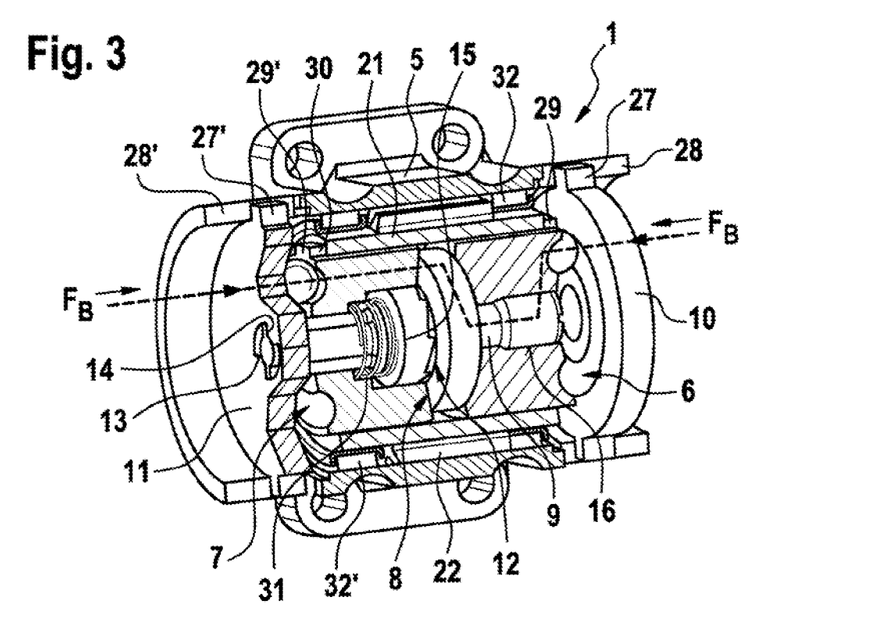
FIG. 3 shows a second embodiment of the expansion unit according to the invention three-dimensionally in a partially sectioned representation with the force flow path shown indicatively.

FIG. 3

FIG. 3 shows another preferred embodiment of the expansion device 1 illustrated in partial section. In contrast to the embodiment according to FIG. 2, the antirotation means for the two expansion pistons 10, 11 is here formed by radially projecting guide noses 27, which enter an axial guide groove 28 in the housing 5. The spring element 31 is furthermore provided as a helical spring instead of a diaphragm spring assembly, as in FIG. 2.

Moreover, a force flow through the expansion device 1 resulting from the expansion forces Fs acting on the expansion device 1 from the brake shoes 2, 3 is illustrated in a simplified way here. Because the supporting piston 24, together with the readjusting screw 9 and the readjusting piston 23, is mounted in a floating manner in the driving sleeve 21, they are in axial force equilibrium during the expansion of the brake shoes 2, 3.

Figure 4A:
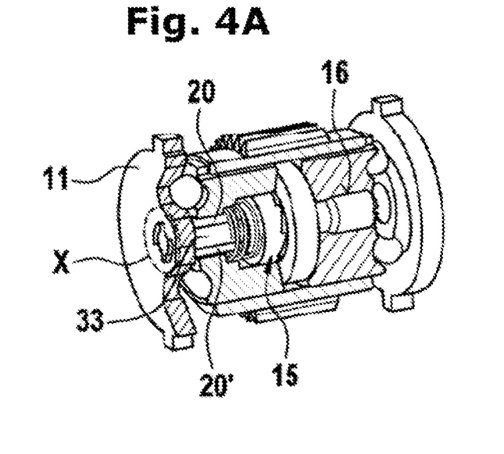
FIGS. 4A and 4B show the embodiment according to FIG. 3 in an unactuated initial position.
Figure 4B:
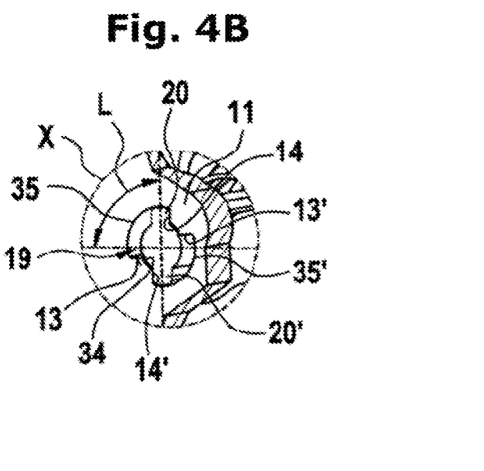

FIGS. 4A and 4B

FIGS. 4A and 4B show the expansion device 1 according to FIG. 3.

The blocking member 15 is mounted between two stops 13, 14 in such a way as to be rotatable in the circumferential direction relative to the expansion piston 11. The rotation angle between the two stops 13, 14 structurally defines the idle rotation L.

For this purpose, a shank 33 is formed on the blocking member 15, and two rib-shaped radial projections 20, 20', with 2 splines in the manner of a splined shaft, are formed on the shank.

Arranged in the expansion piston 11 is an aperture 19, which is here embodied as an axial piercing. However, a pocket-shaped aperture would likewise be permissible within the scope of an aspect of the invention. In cross section, the aperture has a kind of central hole with two substantially circular-sector-shaped cutouts 35, 35' emanating radially from the hole. The sides of the circular-sector-shaped cutouts 35, 35' form the stops 13, 14 and 13', 14' respectively. The blocking member 15 enters the aperture 19 by means of the shank 33 in such a way that the projection 20 is located in the cutout 35. The blocking member 15 can thus be rotated to a limited extent relative to the expansion piston 11 within the idle rotation L, wherein the limitation is imposed by the fact that the side flanks of the projection 20 strike either stop 13 or stop 14.

The idle rotation L, together with the number of teeth in the latching tooth system 17 and the thread pitch of the thread 16, are defining variables for the characteristic of the readjustment unit 8.

According to another embodiment according to the invention (not shown here), the association between the shank 33 and the aperture 19 can be reversed for certain applications inasmuch as the shank 33 with the projection or projections 20 is provided on the expansion piston 11, and the aperture 19 is provided in the blocking member 15. Although this makes the production of the expansion piston 11 more complex, its security against tilting in the assembly can be increased, for example.

In the embodiment shown, the shank 33 is of axially symmetric configuration in cross section, with two opposite identical projections 20, 20'. However, various other variants with just one or more than 2 projections or asymmetric embodiments together with correspondingly adapted apertures 19 are entirely permissible within the scope of the invention.

In the unactuated initial position shown here, the projection 20 rests against stop 14.

Figure 5A:
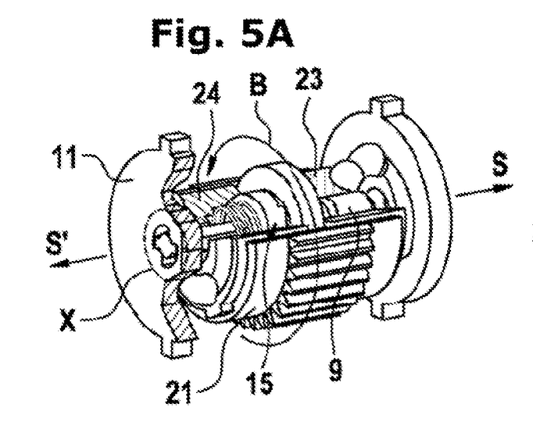
FIGS. 5A and 5B show the embodiment according to FIG. 3 in an actuated position directly after the transition through idle rotation.
Figure 5B:
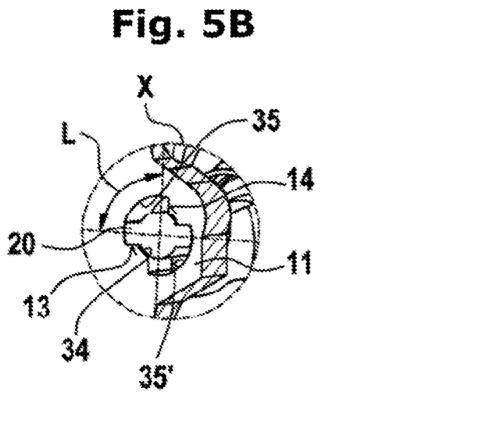

FIGS. 5A and 5B

In the case of a braking process, the driving sleeve 21 is actuated in the actuating direction B and rotates together with the readjusting piston 23, the readjusting screw 3, the supporting piston 24 and the blocking member 15 until the idle rotation L has been traversed and the projection 20 strikes against stop 13.

Figure 6A:
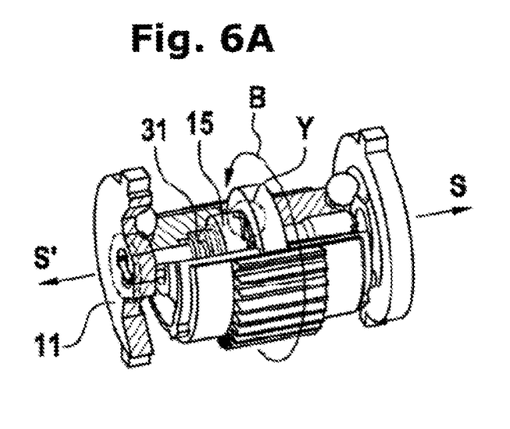
FIGS. 6A and 6B show the embodiment according to FIG. 3 in a position of further actuation relative to FIGS. 5A and 5B, before the initiation of a readjustment process.
Figure 6B:
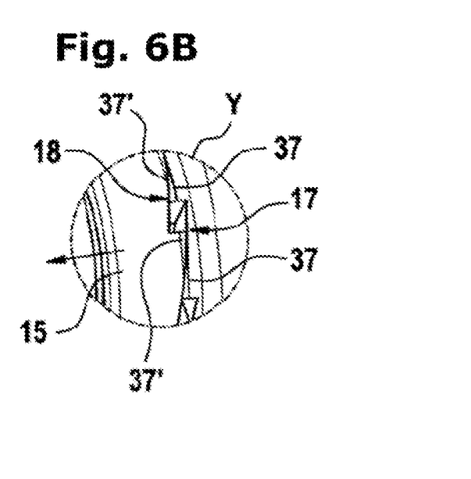

FIGS. 6A and 6B

In the event of further actuation, the blocking member 15 remains stationary owing to stop 13 but the readjusting piston 23 continues to rotate together with the readjusting screw 3 and the supporting piston 24. During this process, the latching tooth systems 17, 18 are moved relative to one another by the readjusting screw 9 or blocking member 15, and the blocking member 15 yields axially in the direction of the expansion piston 11, counter to the spring force of the spring element 31.

If the wear on the brake linings 25 is below a defined threshold, the expansion travel during this positioning process is limited, and the expansion device 1 returns in a fully reversible manner from this state on completion of the braking process.

Figure 7A:
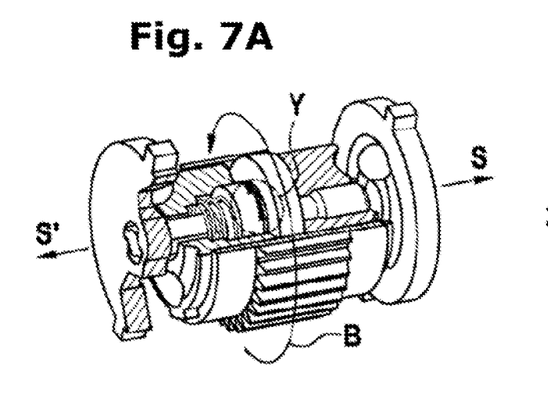
FIGS. 7A and 7B show the embodiment according to FIG. 3 in a position of further actuation relative to FIGS. 6A and 6B, at the changeover point, during the initiation of a readjustment process.
Figure 7B:
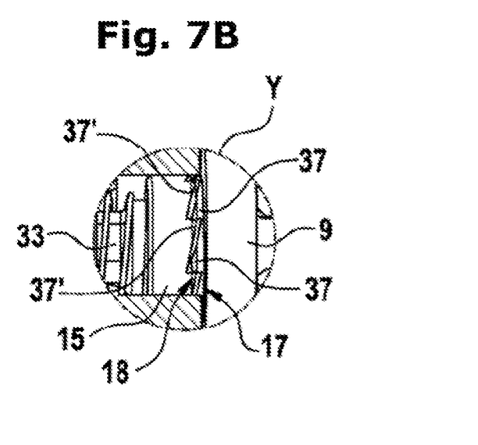

FIGS. 7A and 7B

If wear on the brake linings 25 is above the threshold, the expansion travel increases to such an extent that the driving sleeve 21 rotates further in comparison with the position shown in FIGS. 6A and 6B. As a result, the teeth 37, 37' override each other, and the latching tooth systems 17, 18 latch in a changed, circumferentially offset position owing to the spring force of the spring element 31. A readjustment process is thereby initiated.

Figure 8A:
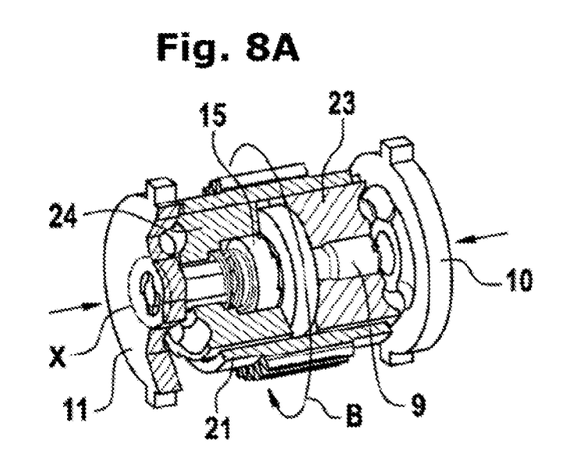
FIGS. 8A and 8B show the embodiment according to FIG. 3 in a release position after the reversal of the idle rotation and before the start of the readjustment.
Figure 8B:
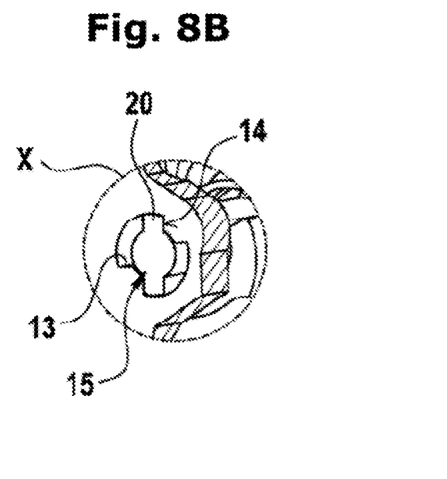

FIGS. 8A and 8B

After the release of the brake, starting from a position shown in FIGS. 7A and 7B, the driving sleeve 21 rotates back together with the readjusting piston 23, the readjusting screw 3, the supporting piston 24 and the blocking member 15 until the idle rotation L has been traversed again, this time in the opposite direction, and the projection 20 strikes against stop 14. During this rotation, the expansion pistons 10, 11 are likewise shifted backwards axially counter to the expansion direction S, as a result of which the level of force in the ball ramp assemblies 6, 7 falls in a corresponding manner.

Figure 9:
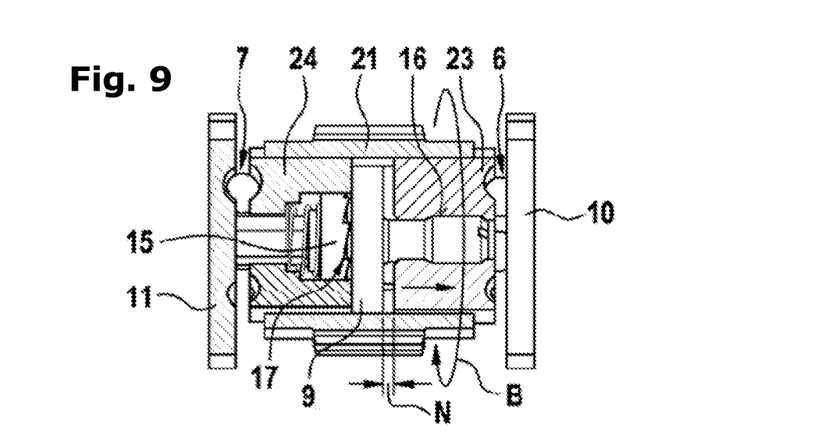
FIG. 9 shows the embodiment according to FIG. 3 in a further-progressed release position relative to FIGS. 8A and 8B, during the readjustment.

FIG. 9

During the further movement in the release direction, the readjustment of the readjusting piston 23 begins after the position shown in FIGS. 8A and 8B.

Further rotation of the readjusting screw 9 is prevented by the latching unit 17 with the blocking member 15 held by stop 14. However, because the driving sleeve 21 continues to rotate together with the readjusting piston 23 as far as the initial position, it is rotated on the thread 16 relative to the readjusting screw 9 and is shifted axially by the readjustment travel N. As a result, the axial spacing between the expansion pistons 10 and 11 in the unactuated initial position is increased. The wear on the brake linings 25 is thus compensated.

During this process, it is substantially only relatively low frictional forces that act in the thread 16 and at the contact surface between the supporting piston 23 and the readjusting screw 9, the high clamping forces in the ball ramp assemblies 6, 7 having been dissipated owing to the idle rotation L.

Figure 10:
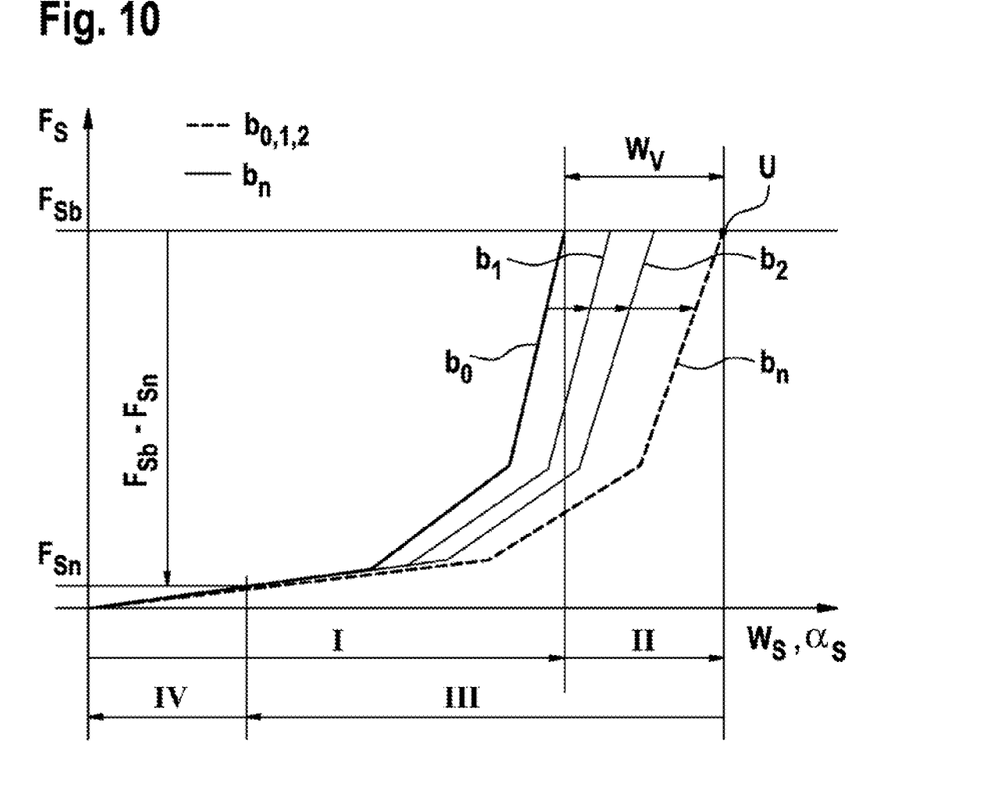
FIG. 10 shows a force/displacement diagram of the expansion device during brake actuation and readjustment.

FIG. 10

FIG. 10 shows a simplified force/displacement diagram of the expansion device 1 according to an aspect of the invention during brake actuation and readjustment.

The solid line symbolizes actuation in the new condition b0 or states of wear b1,2 below the threshold Wv defined for readjustment. The dashed line bn symbolizes actuation with readjustment implemented.

The vertical axis indicates the level of the expansion force Fs acting on the system via the expansion pistons 10, 11. The horizontal axis indicates the expansion travel Ws or the rotation angle as correlated therewith.

In phase I, at the beginning of an actuation, the idle rotation L is first of all traversed (positions shown in FIGS. 4A and 4B, and FIGS. 5A and 5B). In this case, the brake shoes 2, 3 are placed against the brake drum and clamped against it, and the clamping force Fs rises to its operating value Fsb.

In phase II, the latching tooth systems 17, 18 start to rotate relative to one another but without the teeth 37, 37' overriding each other (position shown in FIGS. 6A and 6B). Depending on the state of wear b1, b2, the expansion travel Ws traversed becomes continuously greater. Within this phase, the expansion device 1 returns in a fully reversible manner to the initial state, without readjustment, when the brake is released and the expansion force Fs is reduced.

At the transition point U, the teeth 37, 37' override each other, and the latching unit 12 latches in a new position, and a readjustment process is initiated (position shown in FIGS. 7A and 7B).

In phase III, release of the brake is followed initially by traversal of the idle rotation L back as far as stop 14, during which process the expansion force Fs falls considerably to its residual value in the case of readjustment Fsn (position shown in FIGS. 8A and 8B).

In phase IV, rotation of the readjusting piston 23 relative to readjusting screw 9 takes place at a reduced clamping force Fs, and the readjustment travel N is produced (position shown in FIG. 9).

LIST OF REFERENCE SIGNS

1 Expansion device
2 Brake shoe
3 Brake shoe
4 Drum brake
5 Housing
6 Ball ramp assembly
7 Ball ramp assembly
8 Readjustment unit
9 Readjusting screw
10 Expansion piston
11 Expansion piston
12 Latching unit
13 Stop
14 Stop
15 Blocking member
16 Thread
17 Latching tooth system
18 Latching tooth system
19 Aperture
20 Projection
21 Driving sleeve
22 External tooth system
23 Readjusting piston
24 Supporting piston
25 Brake lining
26 Brake shoe mount
27 Guide nose
28 Guide groove
29 Rib
30 Longitudinal groove
31 Spring element
32 Radial bearing
33 Shank
34 Hole
35 Cutout
36 Mounting slot
37 Tooth
A Expansion axis
B Actuating direction
L Idle rotation
N Readjustment travel
S Expansion direction

The invention claimed is:

1. An expansion device for expanding brake shoes of a drum brake for a vehicle along an expansion axis, comprising:
a housing having a readjustment unit for compensating an expansion travel increased due to brake lining wear,
wherein the readjustment unit comprises a readjusting screw, which is arranged coaxially with the expansion axis and has a thread which brings about an axial movement of at least one expansion piston in the expansion direction by rotation in a first circumferential direction and the rotation of which in an opposite circumferential direction can be blocked by a spring-loaded latching unit, wherein the latching unit allows a defined idle rotation of the readjusting screw, which is defined structurally by a first stop acting in a first direction of revolution and a second stop acting in the opposite direction of revolution, and
wherein the readjustment unit has a blocking member, which is arranged in a manner elastically preloaded axially against the readjusting screw, and the latching unit is arranged between the blocking member and the readjusting screw.

2. The expansion device as claimed in claim 1, wherein the expansion device is driven in rotation and has at least one ball ramp assembly for converting a rotary driving motion into a translational expanding motion along the expansion axis.

3. The expansion device as claimed in claim 1, wherein the latching unit comprises a first latching tooth system, which is formed on the end of the readjusting screw and a second latching tooth system, which is formed on the end of the blocking member and interacts with the first latching tooth system in such a way that relative rotation in one circumferential direction, forming an axially acting force, is possible and relative rotation in the opposite direction is blocked.

4. The expansion device as claimed in claim 1, wherein the blocking member is mounted so as to be rotatable in the circumferential direction between the stops relative to at least one of the at least one expansion piston.

5. The expansion device as claimed in claim 4, wherein the stops are formed as sides of a circular-sector-shaped region of an aperture formed in the at least one expansion piston, which interact with a radial projection on the blocking member.

6. The expansion device as claimed in claim 5, wherein the blocking member has at least one shank having the projection arranged thereon, which enters the aperture.

7. An expansion device for expanding brake shoes of a drum brake for a vehicle along an expansion axis, comprising:
 a housing having a readjustment unit for compensating an expansion travel increased due to brake lining wear,
 wherein the readjustment unit comprises a readjusting screw, which is arranged coaxially with the expansion axis and has a thread which brings about an axial movement of at least one expansion piston in the expansion direction by rotation in a first circumferential direction and the rotation of which in an opposite circumferential direction can be blocked by a spring-loaded latching unit,
 wherein the latching unit allows a defined idle rotation of the readjusting screw, which is defined structurally by a first stop acting in a first direction of revolution and a second stop acting in the opposite direction of revolution, and
 wherein the expansion device is actuated by a driving sleeve, which is provided, at least in some region or regions, with an external tooth system and is rotatably mounted in the housing.

8. The expansion device as claimed in claim 7, wherein a readjusting piston having the readjusting screw screwed therein, and a supporting piston are arranged in the driving sleeve, wherein the readjusting piston and the supporting piston are mounted in such a way as to be secured against rotation relative to the driving sleeve and to be axially movable, wherein the supporting piston can be supported axially in the direction of the readjusting piston on the readjusting screw.

9. The expansion device as claimed in claim 8 wherein the expansion device is driven in rotation and has at least one ball ramp assembly for converting a rotary driving motion into a translational expanding motion along the expansion axis and wherein a first ball ramp assembly of the least one ball ramp assembly is formed between the readjusting piston and the first expansion piston, and a second ball ramp assembly of the least one ball ramp assembly is formed between the expansion piston and the second expansion piston.

10. A drum brake comprising at least one expansion device as claimed in claim 1.

11. The expansion device as claimed in claim 3, wherein the blocking member is mounted so as to be rotatable in the circumferential direction between the stops relative to at least one of the at least one expansion piston.

\* \* \* \* \*